(12) United States Patent
Kim et al.

(10) Patent No.: US 7,618,724 B2
(45) Date of Patent: Nov. 17, 2009

(54) ELECTROCHEMICAL DEVICE COMPRISING ELECTRODE LEAD HAVING PROTECTION DEVICE

(75) Inventors: Je Young Kim, Daejeon (KR); Soon Ho Ahn, Daejeon (KR); Pil Kyu Park, Daejeon (KR); Soo An Choi, Anyang-si (KR); Yong Tae Lee, Jeonju-si (KR); Ju Dam Kim, Anyang-si (KR)

(73) Assignees: LG Chem, Ltd. (KR); LS Mtron Ltd. (KR)

( * ) Notice: Subject to any disclaimer, the term of this patent is extended or adjusted under 35 U.S.C. 154(b) by 774 days.

(21) Appl. No.: 11/103,732

(22) Filed: Apr. 12, 2005

(65) Prior Publication Data

US 2006/0008698 A1 Jan. 12, 2006

(30) Foreign Application Priority Data

Apr. 13, 2004 (KR) .................. 10-2004-0025394

(51) Int. Cl.
*H01M 2/06* (2006.01)
*H01M 10/50* (2006.01)

(52) U.S. Cl. .................. 429/7; 429/61; 429/62; 429/181

(58) Field of Classification Search .......... 429/7, 429/61, 62, 161, 181
See application file for complete search history.

(56) References Cited

U.S. PATENT DOCUMENTS 6,387,567 B1 * 5/2002 Noh .................. 429/181 X
7,122,276 B2 * 10/2006 Gu .................. 429/181 X
2004/0175611 A1 * 9/2004 Otohata et al. .......... 429/181 X
2004/0234848 A1 * 11/2004 Chung et al. .................. 429/181
2005/0014036 A1 * 1/2005 Kim .................. 429/7
2005/0191549 A1 * 9/2005 Kang et al. .................. 429/7 X

FOREIGN PATENT DOCUMENTS

| CN | 1523688 A | 8/2004 |
|---|---|---|
| JP | 57-017560 | 1/1982 |
| JP | 08-153509 | 6/1996 |
| JP | 2001-196048 | 7/2001 |
| JP | 2002-355947 | 12/2002 |
| JP | 2003-45492 | 2/2003 |
| JP | 2003-109559 | 4/2003 |
| JP | 2004-11186 | 4/2004 |
| RU | 2216824 C2 | 11/2003 |

* cited by examiner

*Primary Examiner*—Stephen J. Kalafut
(74) *Attorney, Agent, or Firm*—Cantor Colburn LLP

(57) ABSTRACT

Disclosed is an electrochemical device including an electrode assembly having a cathode, anode and an electrolyte, and a casing surrounding the electrode assembly. The device further includes a protection device to which either or both of a cathode lead for connecting a cathode with an outer terminal and an anode lead for connecting an anode with an outer terminal are connected electrically, wherein the protection device is disposed in the inner space of the casing and the electrode lead equipped with the protection device is folded at both sides of the protection device so that the largest surface of the protection device is layered on a lateral surface of the casing where the electrode lead is present.

20 Claims, 9 Drawing Sheets
(7 of 9 Drawing Sheet(s) Filed in Color)

(a)

(b)

(c)

(d)

(e)

(f)

ELECTROCHEMICAL DEVICE COMPRISING ELECTRODE LEAD HAVING PROTECTION DEVICE

This application claims the benefit of the filing date of Korean Patent Application No. 10-2004-0025394, filed on Apr. 13, 2004, in the Korean Intellectual Property Office, the disclosure of which is incorporated herein in its entirety by reference.

TECHNICAL FIELD

The present invention relates to an electrochemical device comprising an electrode lead having a protection device for interrupting electric current when the temperature of an electrochemical device increases.

BACKGROUND ART

Recently, there is an increasing interest in energy storage technology. Batteries have been widely used as energy sources in portable phones, camcorders, notebook computers, PCs and electric cars, resulting in intensive research and development into them. In this regard, electrochemical devices are subjects of great interest. Particularly, development of rechargeable secondary batteries is the focus of attention. Recently, research and development into novel electrode and battery that can improve capacity density and specific energy have been made intensively in the field of secondary batteries.

Among currently used secondary batteries, lithium secondary batteries appearing in early 1990's have drive voltage and energy density higher than those of conventional batteries using aqueous electrolytes (such as Ni—MH batteries, NI—Cd batteries, $H_2SO_4$—Pb batteries, etc). For these reasons, lithium secondary batteries are advantageously used. However, such lithium secondary batteries have disadvantages in that organic electrolytes used therein may cause safety-related problems resulting in ignition and explosion of the batteries and that processes for manufacturing such batteries are complicated. More recently, lithium ion polymer batteries developed for the purpose of overcoming the shortcomings of lithium ion batteries have been thought of as a candidate leading the next generation batteries. However, such lithium polymer batteries developed up to date have a relatively low capacity compared to lithium ion batteries and provide insufficient discharge capacity at low temperature. Therefore, there is an imminent need for batteries capable of solving the above-mentioned problems.

Lithium ion batteries have an operation mechanism different from that of nickel-metal hydride batteries or nickel-cadmium batteries. Each of $LiCoO_2$ and graphite used in a lithium ion battery as cathode active material and anode active material, respectively, has a crystal structure in which an empty space is present. During charge/discharge cycles, Li ions repeatedly intercalate into and deintercalate out of the empty space and thus move inside of a battery.

A battery is manufactured in its discharged state. During a charge cycle, lithium contained in the $LiCoO_2$ crystals deintercalates out of the crystals, moves to an anode and thus intercalates into the crystal structure of graphite. On the contrary, during a discharge cycle, lithium contained in graphite deintercalates out of the crystal structure of graphite and then intercalates into crystals present in a cathode. Such repeated comings and goings of Li ions between a cathode and anode are referred to as the so-called rocking chair concept, which forms the operation mechanism of a lithium ion battery.

Evaluation of and security in safety of batteries are very important. It should be considered in the first place that users have to be protected from being damaged due to malfunctioning of batteries. To satisfy this, safety of batteries is strictly restricted in terms of ignition and combustion in batteries by safety standards. Overcharge of a battery is the most imminent problem to be solved.

All batteries are dangerous when overcharged and lithium ion batteries cannot be an exception. When a battery is overcharged, lithium ions move continuously from a cathode to an anode present in a state wherein lithium completely occupies the empty space in the crystal structure of graphite, as viewed from the geometrical point, so that lithium ions grow on the surface of anode, resulting in formation of dendrite having a resinous structure. Such dendrite may result in explosion and firing of a battery when the battery is abused. Morphology of the dendrite depends on the kind of lithium salt contained in an electrolyte.

The most dangerous phenomenon resulting from overcharge of a battery is "high-temperature overcharge", which is the worst case occurring in lithium ion batteries. When a lithium ion battery is overcharged to a voltage of 4.2V or more, electrolyte starts to be decomposed and tends to have a high possibility for ignition as the battery temperature increases to reach the flash point. However, there is no occurrence of ignition in the closed spaced of a battery because oxygen is not supplied thereto. $LiCoO_2$ used as cathode active material forms a layered structure of "O—Co—O" in which a Co layer locates between oxygen atom layers, such structure forming a sandwich-like shape. Additionally, $LiCoO_2$ may form a crystal structure of "O—Co—O—Li—O—Co—O" in which a Li layer locates between two sandwich-like structures. The latter structure is not stable.

At high temperature, $LiCoO_2$ has a great tendency to be converted into a stable spinel structure (die-like structure). The spinel has a molecular formula of $LiCO_2O_4$ and thus has a small amount of oxygen per unit cell compared to a layered structure. Therefore, in this case, remaining oxygen moves to an electrolyte so that oxygen may be supplied to the electrolyte reaching its flash point, thereby causing explosion of a battery. However, because a battery itself cannot prevent the heat emission as mentioned above, many attempts have been made, for example, to mount a protection circuit on a battery or to apply heat obstruction by using a separator.

Particularly, it is known that protection devices such as a PTC (positive temperature coefficient) device or thermal fuse are efficient when they are disposed in the vicinity of an electrode as heat emitting source (for example, at the central portion or lateral surface of a battery) by means of resistance welding, in order to promptly detect an increase in battery temperature followed by abnormal operation of the battery. Additionally, such protection devices are frequently disposed at the lateral side portion of a battery so as to increase energy efficiency per volume.

As the most recent approach, Japanese Laid-Open Patent No. 2003-45492 discloses a battery comprising a heat-sensitive protection device (PTC) mounted on an electrode lead having relatively high heat conductivity, wherein the corresponding protection device is disposed at the sealing region. However, according to the battery, because the PTC device is mounted on the exterior of a battery and the battery casing has low heat conductivity, it is not possible to respond sensitively to variations in temperature inside of the battery in practice. Further, because the battery is manufactured through a complicated process, it shows poor industrial applicability in practice.

DISCLOSURE OF THE INVENTION

Therefore, the present invention has been made in view of the above-mentioned problems. It is an object of the present invention to provide an electrochemical device, which comprises a protection device activated immediately in response to an increase in temperature of the electrochemical device to interrupt electric current so that the electrochemical device can be protected while minimizing a drop in energy density per volume of electrochemical device.

It is another object of the present invention to provide an electrochemical device pack having one or more of the above electrochemical devices.

According to an aspect of the present invention, there is provided an electrochemical device comprising an electrode assembly having a cathode, anode and an electrolyte, and a casing surrounding the electrode assembly, which further comprises a protection device to which either or both of a cathode lead for connecting a cathode with an outer terminal and an anode lead for connecting an anode with an outer terminal are connected electrically, wherein the protection device is disposed in the inner space of the casing and the electrode lead equipped with the protection device is folded at both sides of the protection device so that the largest surface of the protection device is layered on a lateral surface in the casing where the electrode lead is present.

According to another aspect of the present invention, there is provided an electrochemical device comprising an electrode assembly having a cathode, anode and an electrolyte, the electrode assembly being enclosed with a casing having an inner surface and an outer surface, wherein the electrochemical device further comprises a protection device to which either or both of a cathode lead for connecting a cathode with an outer terminal and an anode lead for connecting an anode with an outer terminal are connected electrically, the protection device is disposed at a sealing region between inner surfaces of the casing, and the sealing region of the casing is folded so that the sealing region having the protection device is layered on a lateral surface of the casing.

The protection device that may be disposed in the inner space of a casing or at the sealing region of a casing according to the present invention includes a PTC device, thermal fuse, bimetal device, Zener diode, etc.

According to the present invention, the protection device is electrically connected to an electrode lead in series or in parallel, preferably in series. The connection between the cathode lead or anode lead and the protection device can be made by welding.

Preferably, the protection device that may be used in the present invention is a protection device that protects an electrochemical device from an increase in temperature of the electrochemical device.

The PTC device used in the present invention as protection device, which is electrically connected to an electrode lead in series, can interrupt electric current by the occurrence of a rapid increase in resistance, when the temperature of a battery increases abnormally (for example, in the case of an overcurrent or external short circuit, particularly in the case of an overcharge), so that the temperature cannot increase any more. Therefore, the PTC device can improve the battery safety.

In one embodiment of the present invention, the protection device is disposed inside of the casing of electrochemical device, and the largest surface of the protection device is layered on the lateral surface in the casing where the electrode lead is present. For example, in the case of a stacked electrode assembly having four stacked surfaces, the protection device is disposed in the space between the stacked surface on which the electrode lead is present and the casing, and the surface of the protection device is opposite to the stacked surface on which the lead is present. In this case, the protection device can respond promptly to an increase in temperature of the electrochemical device with no occurrence of a drop in energy density of the electrochemical device.

When the protection device is disposed in the inner space of the casing as described above, it is preferable to fold the lead in such a manner that the largest surface of the protection device can be layered on the lateral surface of the battery. For example, it is preferable to fold the cathode lead or anode lead electrically connected to the protection device in such a manner that the protection device can be disposed in parallel with the space between the stacked surface of the stacked electrode assembly and the casing (and that the surface of the protection device can be opposite to the stacked surface).

Particularly, it is preferable to perform taping of both surfaces of the lead by using an insulation film in order to prevent interconnection in the lead to be folded (see, FIG. 6a). Additionally, the lead or the protection device is taped with an insulation tape in order to prevent electric short circuit. Particular examples of the insulation film include an imide insulation film.

Further, the portion having the protection device is preferably coated with a polymer in order to prevent the breakage of a protection device (for example, a PTC sheet) caused by infiltration of an electrolyte into the protection device. Non-limiting examples of the polymer include polyethylene, polypropylene, polyurethane, epoxy resin, silicone, etc.

In another embodiment, the protection device is disposed at the sealing region between inner surfaces of a casing. In this case, it is preferable to minimize the temperature and pressure upon sealing so that the breakage of the protection device itself can be prevented.

Meanwhile, it is more efficient in terms of safety that the protection device has a contact surface with the electrode assembly as large as possible so that the heat generated from the inside of the electrode assembly can be detected with high sensitivity. Therefore, it is preferable that the protection device extends by a predetermined length along the direction away from the longitudinal direction of the lead connected by the protection device, preferably along the perpendicular direction (see, FIGS. 2c, 2d, 2e and 2f). By doing so, the protection device can extend on the lateral surface of the casing, while minimizing a drop in energy density per volume caused by such extended protection sheet. If the protection device is disposed at the sealing region of the casing and the sealing region of the casing is folded to be layered on the lateral surface of the casing, the extended portion of the protection device is also layered on the lateral surface of the casing. Particularly, when the protection device is present in the vicinity of an electrode tab lead, the heat generated from an electrochemical device during an overcharge state is conducted mainly through the electrode lead. As a result, heat conductivity to the protection device may decrease. Therefore, according to the present invention, the portion of the protection device exposed by extending from a linear lead, preferably along the perpendicular direction, can improve the sensitivity to an increase in temperature of the electrochemical device as well as heat conductivity (see, FIGS. 3, 7 and 11). In other words, the heat generated from the electrochemical device under an overcharge state can be conducted not only through the electrode lead but also directly to the exposed portion of the protection device, thereby increasing operational efficiency of the protection device.

As shown in FIG. 13, when an electrode assembly having a stacked structure is provided and each lead is connected to an electrode tab in the form of "V" (see, drawing number 6 in FIG. 1), a vacancy is created between the stacked surface of the electrode assembly and the casing (see, drawing number 7 in FIG. 1).

When the protection device is disposed in the space between a cathode tab and anode tab in a stacked electrode assembly including an electrode tab having a V-form (see, FIG. 7a) as described above, there is no drop in capacity of the battery. Additionally, it is possible to maximize the contact area between the protection device and the battery.

Although the present invention can be generally applied to lithium ion batteries, it can also be applied to all electrochemical devices including nickel-metal hydride batteries, nickel cadmium batteries, etc. Additionally, the present invention will have applicability to future batteries that can substitute for lithium ion batteries.

An embodiment of the present invention, characterized by comprising a protection device disposed inside of a casing, can be applied to pouch-type, cylindrical and prismatic batteries with no particular limitation in shape of the battery casing.

Meanwhile, another embodiment of the present invention, characterized by comprising a protection device disposed at the sealing region of a casing, is suitable for pouch-type batteries. Contrary to prismatic or cylindrical batteries, pouch-type batteries generally using an aluminum pouch as casing permit the protection device to be disposed at the sealing region in practice.

Hereinafter, preferred embodiments of pouch-type batteries, particularly lithium ion polymer secondary batteries, to which the present invention is applied, will be explained in more detail with reference to the accompanying drawings.

As shown in FIG. 1, an electrode assembly 1 is enclosed and sealed by a casing 2 made of an insulation material and includes a cathode, anode, separator interposed between the cathode and anode and a gel polymer. A cathode lead 3 and anode lead 4 are connected to a cathode and anode, respectively. The cathode lead and anode lead are heat sealed into a sealing region 5 disposed in the circumference of the casing.

FIG. 2 shows several embodiments of two leads connected to each other by a protection device (for example, PTC device) according to the present invention.

The PTC device is formed by crosslinking between carbon black as conductive agent and polyethylene as matrix polymer.

Hereinafter, the present invention will be exemplified by a lithium secondary battery.

The lithium secondary battery includes a cathode comprising a lithium composite oxide as cathode active material, an anode capable of lithium intercalation/deintercalation, a non-aqueous electrolyte and a separator.

The cathode active material forming the cathode includes a lithium composite oxide. Particular examples of the lithium composite oxide include lithium intercalation material-based oxides such as lithiated manganese oxides, lithiated cobalt oxides, lithiated nickel oxides or other composite oxides obtained by combination thereof. The cathode active material is bonded to a cathode current collector such as foil formed of aluminum, nickel or combinations thereof to provide the cathode.

The anode active material forming the anode of a lithium secondary battery includes lithium metal, lithium alloys, or lithium intercalation materials such as carbon, petroleum coke, activated carbon, graphite or other types of carbon. The anode active material is bonded to an anode current collector such as foil formed of copper, gold, nickel, copper alloys or combinations thereof to provide the anode.

The separator that may be used has a micro-porous structure and includes multilayer films formed of polyethylene, polypropylene or combinations thereof, or polymer films for solid polymer electrolytes or gel polymer electrolytes such as polyvinylidene fluoride, polyethylene oxide, polyacrylonitrile or polyvinylidene fluoride-hexafluoropropylene copolymer.

The electrolyte that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $ASF_6^-$, $CH_3CO_2^-$, $CF_3SO_3^-$, $N(CF_3SO_2)_2^-$, $C(CF_2S_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone and mixtures thereof.

Additionally, there is no particular limitation in shape of the electrochemical device to which the present invention is applied. The electrochemical device may be a thin-type or large-size device, etc. Further, the present invention may be applied to a stacked device having a plurality of electrochemical devices, hard pack-type device having a pack casing in which an electrochemical device is contained and a soft pack-type device including an electrochemical device exposed to the exterior.

BRIEF DESCRIPTION OF THE DRAWINGS

The patent or application file contains at least one drawing executed in color. Copies of this patent or patent application publication with color drawings will be provided by the Office upon receipt and payment of the necessary fee.

FIGS. 4-7 are pictures each showing an embodiment of a PTC lead applied to a battery for practical use, wherein FIG. 4 shows a PTC lead whose PTC portion is present on the exterior of a casing;

FIG. 5 shows a PTC lead whose PTC portion is present at the adhesion region (sealing region) of a casing;

FIG. 6b shows the appearance of a battery packed with a casing after mounting a PTC in the vicinity of an electrode tab inside of the casing as shown in FIG. 6a;

FIG. 7b shows the appearance of a battery packed with a casing, the battery including the PTC lead disposed as shown in FIG. 7a.

THE DESCRIPTION OF REFERENCE NUMERALS IN THE DRAWINGS

Figure 1:
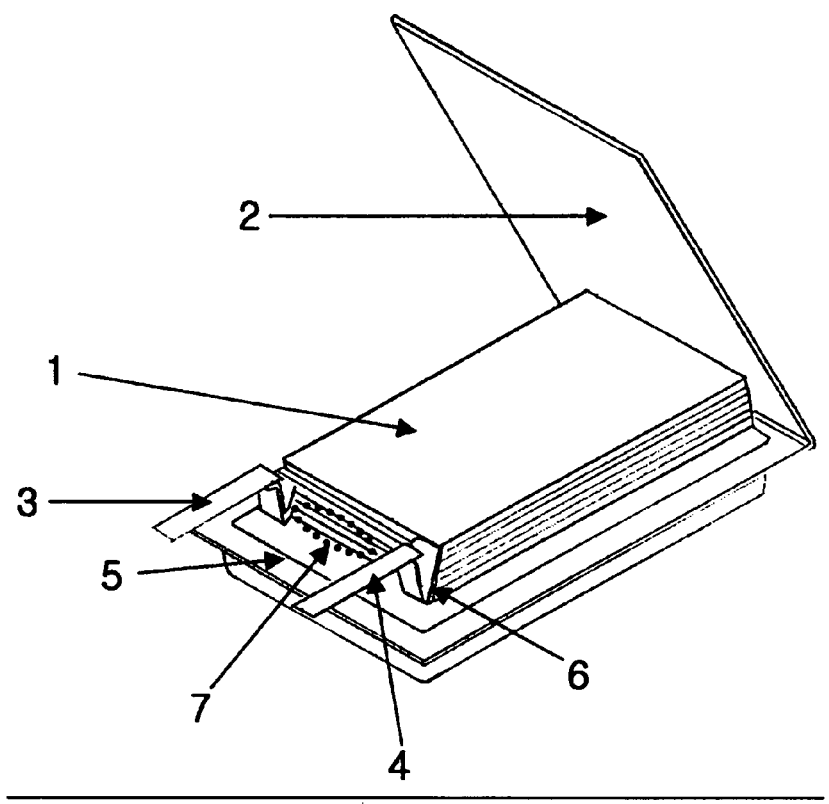
FIG. 1 is a schematic view showing a pouch-shaped electrochemical device used in the present invention.

1: an electrode assembly
2: a casing (aluminum pouch-type)
3: a cathode lead
4: an anode lead
5: an adhesion region (sealing region) of a casing
6: a V-form of electrode tab lead
7: a space between a cathode tab and anode tab created by the formation of a V-form

MODE FOR CARRYING OUT THE INVENTION

Reference will now be made in detail to the preferred embodiments of the present invention. It is to be understood that the following examples are illustrative only and the present invention is not limited thereto.

EXAMPLES

Comparative Example 1

Figure 2:
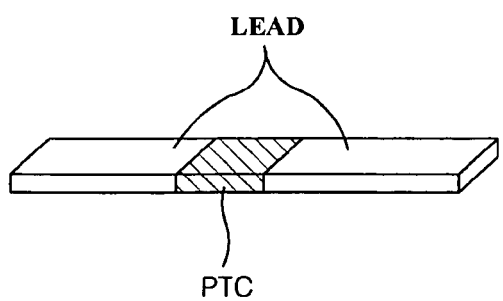
FIGS. 2a-2f are illustrative views each showing two leads connected to each other via a protection device (e.g. PTC) according to the present invention.
Figure 2:
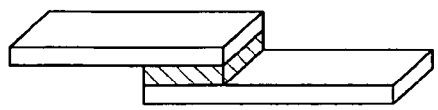
Figure 2:
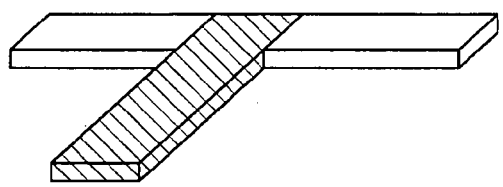
Figure 2:
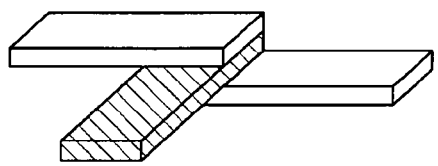
Figure 2:
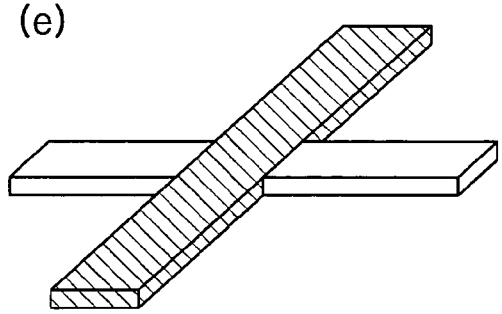
Figure 2:
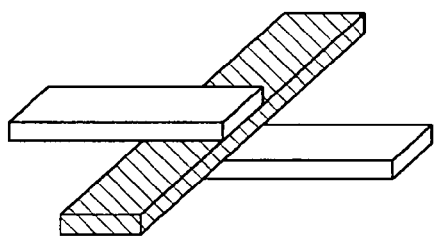
Figure 3:
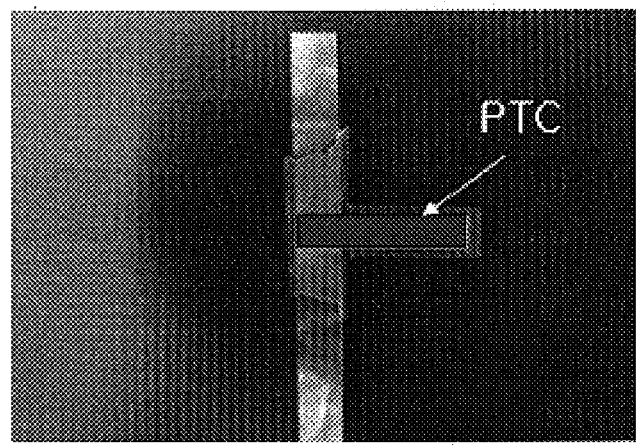
FIG. 3 is a picture showing an embodiment of a T-shaped PTC lead for practical use.
Figure 4:
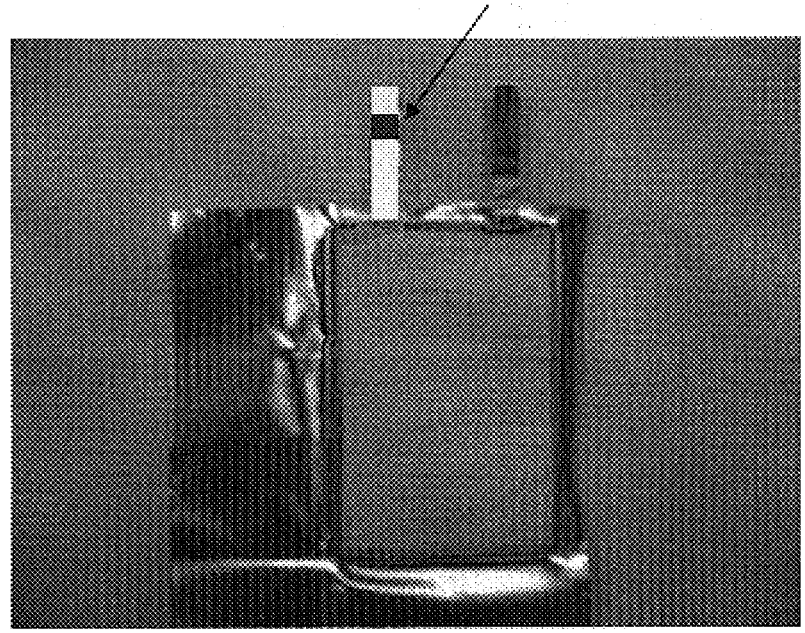

A PTC device (Model No. NSP-L500) available from LG Cable Co. was mounted on a lithium ion polymer secondary battery (Trade Name: ICP323456, 600 mah) available from LG Chem., Ltd. The PTC device was heat sealed with a cathode lead to provide the form as shown in FIG. 2b. Then, the battery was enclosed with a pouch-type casing in such a manner that the PTC portion is present on the exterior of the casing as shown in FIG. 4.

Example 1

Figure 5:
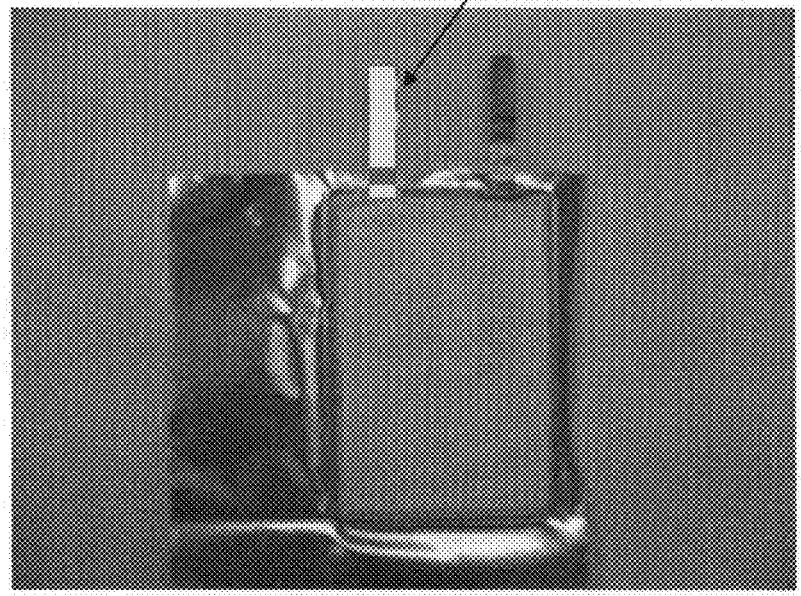

The same lithium ion polymer secondary battery available from LG Chem., Ltd. and the same PTC device available from LG Cable Co. as Comparative Example 1 were used. In this Example, the PTC device was heat sealed with a cathode lead to provide the form as shown in FIG. 2b. Then, the battery was enclosed with a pouch-type casing in such a manner that the PTC portion is present at the inner sealing region of the casing as shown in FIG. 5.

Example 2

Figure 6A:
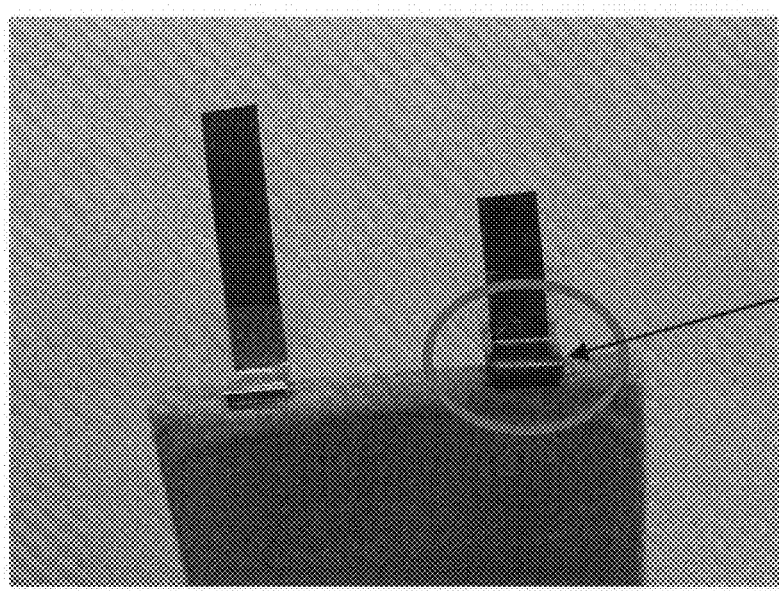
FIG. 6a shows a PTC lead whose PTC portion is disposed in the vicinity of an electrode tab inside of a casing.

The same lithium ion polymer secondary battery available from LG Chem., Ltd. and the same PTC device available from LG Cable Co. as Comparative Example 1 were used. Similarly, the PTC device was heat sealed with a cathode lead to provide the form as shown in FIG. 2b. Then, the battery was enclosed with a pouch-type casing in such a manner that the PTC portion is present inside of the casing as shown in FIG. 6a. Particularly, in order to minimize the loss of energy density, the lead was folded so that the PTC sheet is disposed between the stacked surface (surface having the lead) of the electrode assembly and the casing. Additionally, the lead was insulated by using an imide film so as to prevent interconnection between leads (see, FIG. 6a).

Example 3

The same lithium ion polymer secondary battery available from LG Chem., Ltd. and the same PTC device available from LG Cable Co. as Comparative Example 1 were used. Similarly, the PTC device was heat sealed with a cathode lead to provide the form as shown in FIG. 2d. Then, the battery was enclosed with a pouch-type casing in such a manner that the extended portion of the PTC sheet is present between the cathode tab and anode tab. Additionally, the PTC sheet was coated with a polymer so as to prevent breakage of the PTC layer caused by infiltration of electrolyte.

Comparative Example 2

The same battery as Comparative Example 1 was provided, the battery using a conventional lead with no protection device.

<Evaluation>

Figure 8:
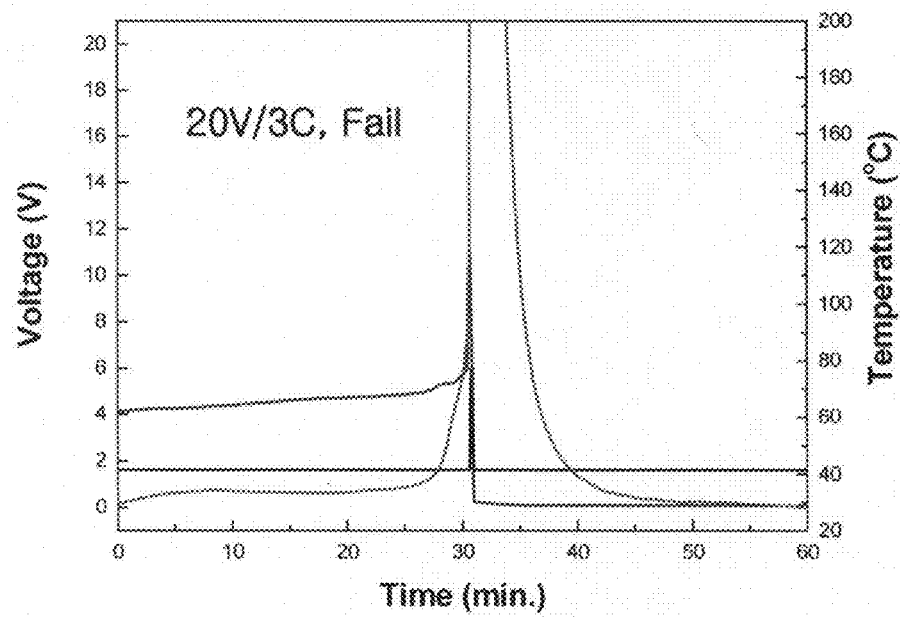
FIG. 8 is a graph showing variations in temperature and voltage, obtained from the overcharge test of an actual polymer battery (Comparative Example 1) having a PTC lead whose PTC portion is disposed on the exterior of a casing.
Figure 9:
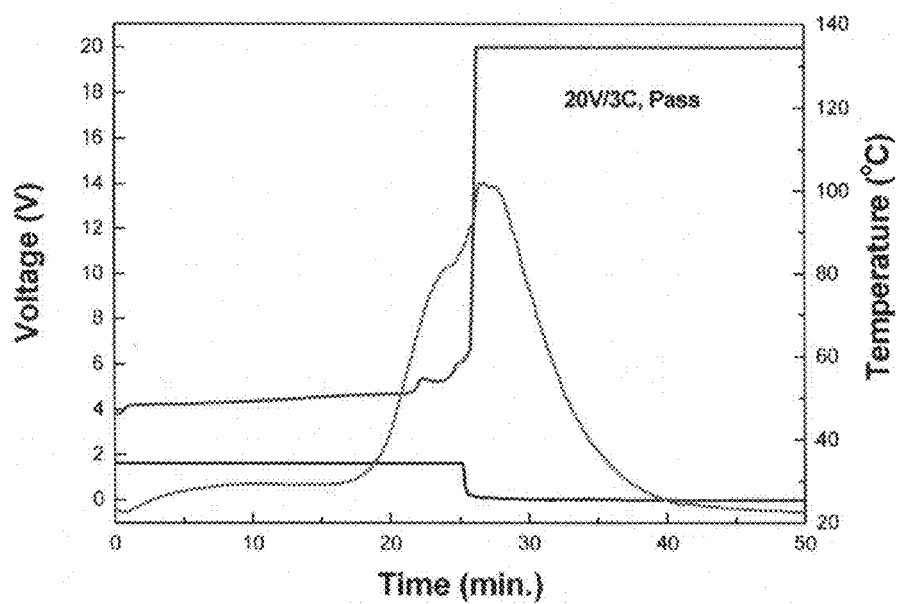
FIG. 9 is a graph showing overcharge behaviors of a battery (Example 1) having a PTC lead whose PTC portion is disposed at the sealing region.
Figure 10:
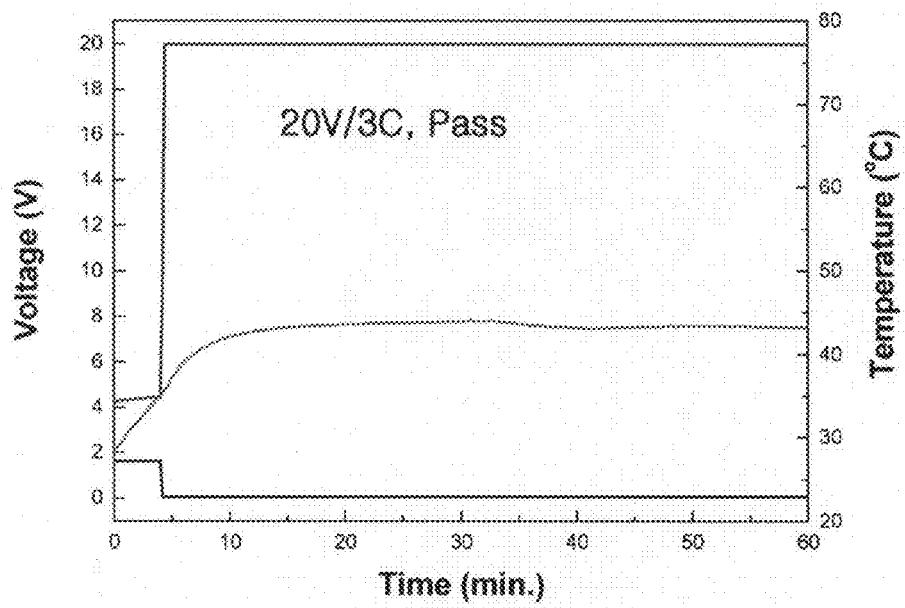
FIG. 10 is a graph showing overcharge behaviors of a battery (Example 2) having a PTC lead whose PTC portion is disposed at a tab region inside of the battery.
Figure 11:
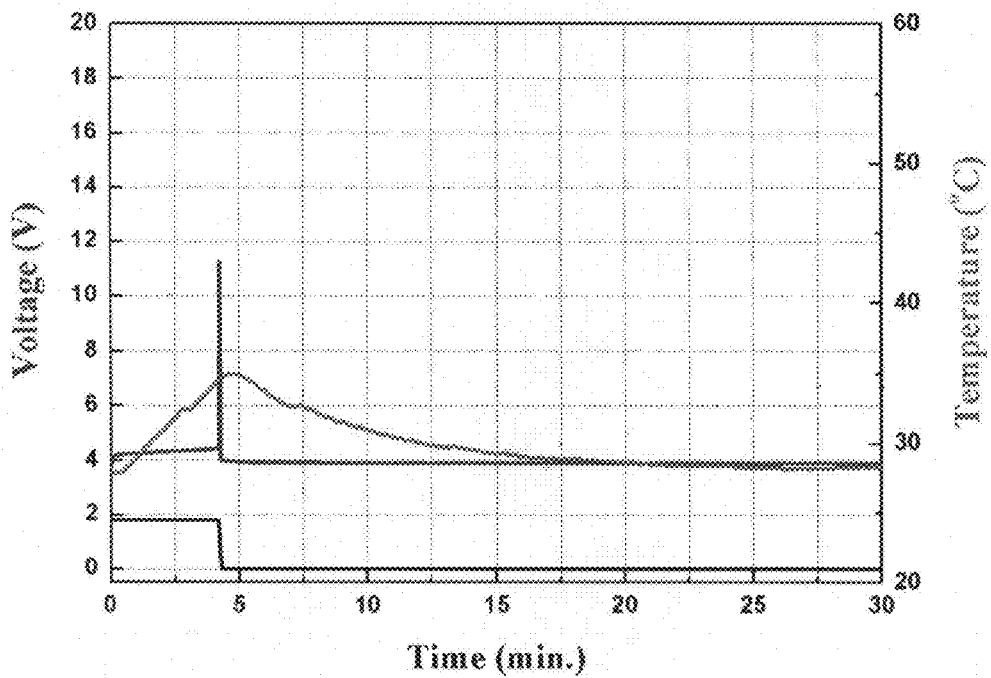
FIG. 11 is a graph showing overcharge behaviors of a battery (Example 3) having a PTC lead whose PTC portion extends in the space between a cathode tab and anode tab.
Figure 12:
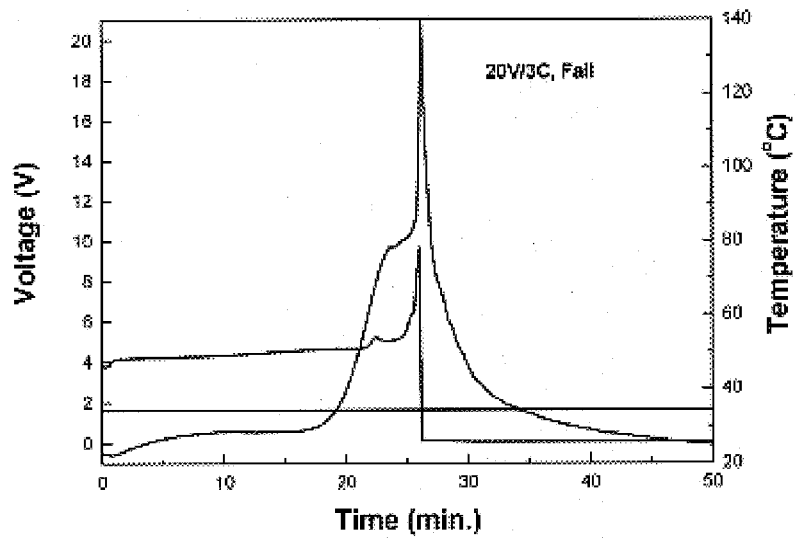
FIG. 12 is a graph showing overcharge behaviors of a battery (Comparative Example 2) having a conventional lead instead of a PTC lead.
Figure 13:
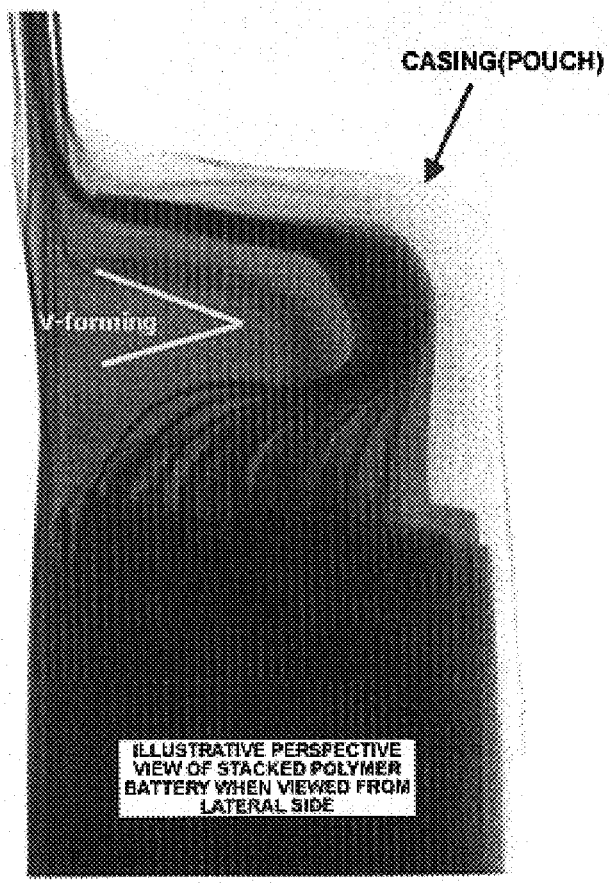
FIG. 13 is a perspective view showing the formation of a V-form in a battery having a stacked structure, when viewed from a lateral side.

Each of the lithium ion polymer secondary batteries obtained from the above Examples 1, 2 and 3 and Comparative Examples 1 and 2 was overcharged (20V/3C) and variations in temperature and voltage were shown in FIG. 8 (Comparative Example 1), FIG. 9 (Example 1), FIG. 10 (Example 2), FIG. 11 (Example 3) and FIG. 12 (Comparative Example 2). As can be seen from FIGS. 8 and 12, both of the battery using no PTC device and the battery including a PTC device disposed on the exterior of the battery casing exploded, while the batteries including a PTC layer disposed inside of the batteries were safe as shown in FIGS. 9, 10 and 11. Referring to FIGS. 8 and 12, each battery ignited and the battery temperature increased to 200° C. or higher. However, as can be seen from FIGS. 9, 10 and 11, the highest temperature was 105° C., 45° C. and 35° C. in each case (based on the surface temperature of an electrode assembly). Additionally, it can be seen that the battery according to Example 3, which includes a sheet-like PTC protection device extending from the lead so as to provide a large contact area with the electrode assembly, was safer than the battery according to Example 2, which has a relatively small contact area.

Figure 6B:
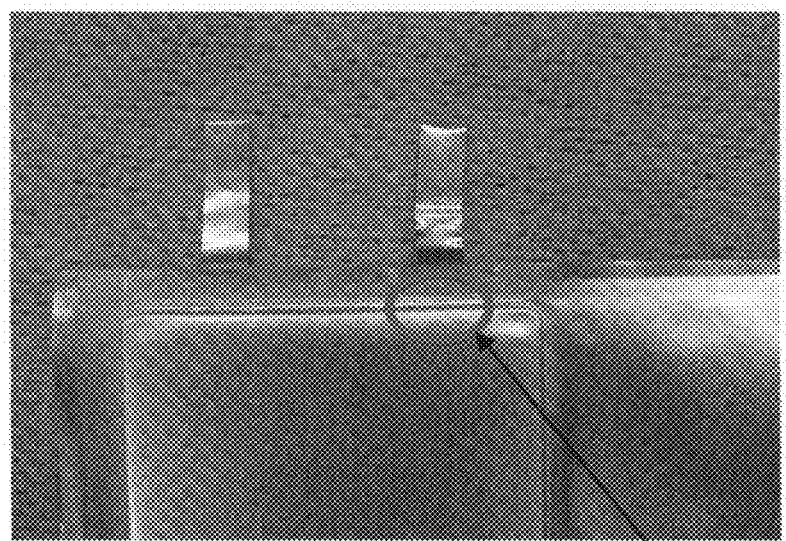
Figure 7A:
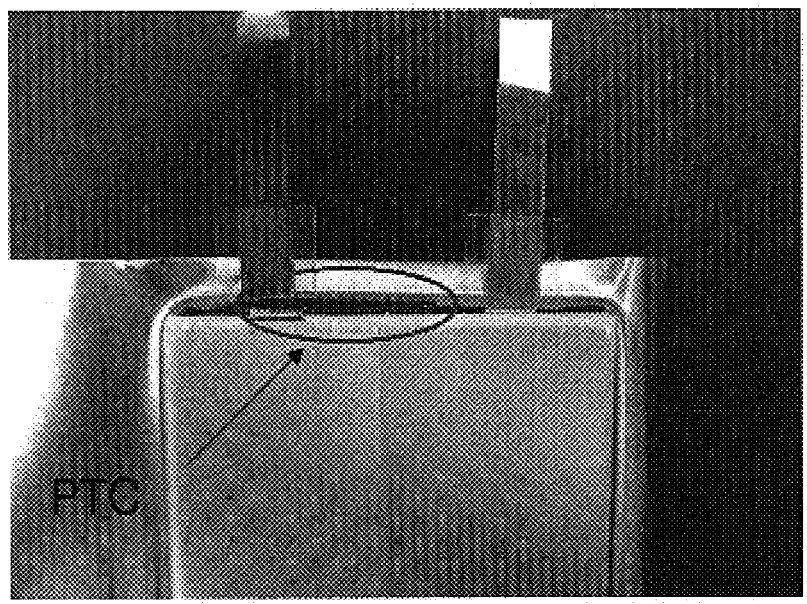
FIG. 7a shows a T-shaped PTC lead whose PTC portion is disposed in an inner space (a space between a cathode tab and anode tab) created by the formation of a V-form in a battery having a stack-and-winding structure.
Figure 7B:
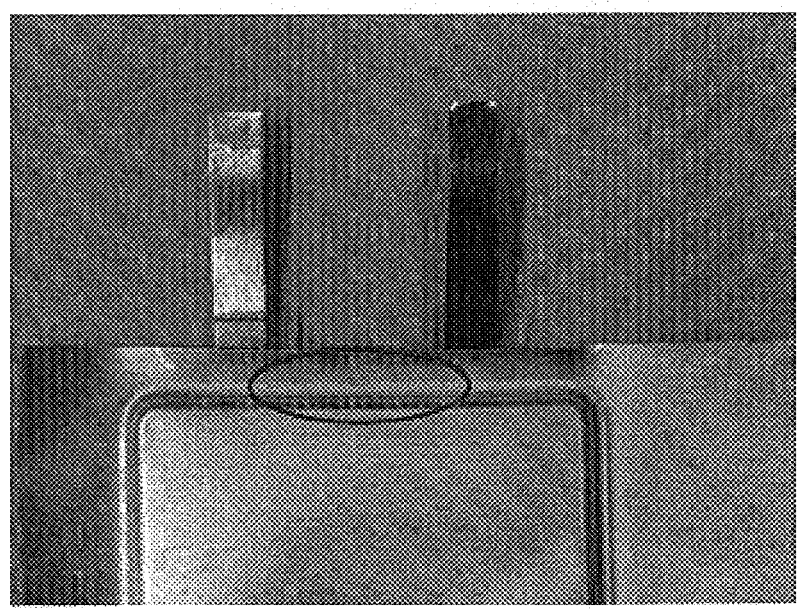

As can be seen from the above results obtained from the overcharge test, disposing a PTC device inside of an electrochemical device provides a significant improvement in terms of safety, compared to disposing a PTC device on the exterior of the electrochemical device. It is thought that this results from the temperature dependency of a PTC device, which is the principle of operation in PTC devices, the temperature dependency being more sensitive inside of an electrochemical device. Therefore, PTC leads having the form of FIG. 5, 6 or 7 are the most preferred embodiments in terms of safety and performance.

The PTC lead as described above provided excellent results after various safety tests including nail penetration test, high-temperature oven test, etc., for a pack comprising a plurality of electrochemical devices as well as in the above overcharge test.

INDUSTRIAL APPLICABILITY

As can be seen from the foregoing, the electrochemical device according to the present invention includes a protection device disposed at the sealing region of a casing or inside of a casing, wherein the largest surface of the protection device is layered on the lateral surface of the casing. Therefore, it is possible to improve the sensitivity of the protection device to an increase in temperature of the battery, reaction degree and heat conductivity, while minimizing a drop in energy density per volume caused by the protection device. Ultimately, according to the present invention, it is possible to improve the safety of an electrochemical device.

The invention claimed is:

1. An electrochemical device comprising an electrode assembly having a cathode, anode and an electrolyte, and a casing surrounding the electrode assembly, which further comprises at least one protection device to which either or both of a cathode lead for connecting a cathode with an outer terminal and an anode lead for connecting an anode with the outer terminal are connected electrically, in series or in parallel, wherein the at least one protection device is disposed at an inner space of the casing and said either or both of the cathode lead and the anode lead equipped with the at least one protection device are folded at both sides of the at least one protection device so that the largest surface of the at least one protection device is layered on a lateral surface of the casing where said either or both of the cathode lead and the anode lead is present.

2. An electrochemical device comprising an electrode assembly having a cathode, anode and an electrolyte, the electrode assembly being enclosed with a casing having an inner surface and an outer surface, wherein the electrochemical device further comprises at least one protection device to which either or both of a cathode lead for connecting a cathode with an outer terminal and an anode lead for connecting an anode with an outer terminal are connected electrically, in series or in parallel, the protection device is disposed at a sealing region disposed at an inner surfaces of the casing, and the sealing region of the casing is folded so that the sealing region having the at least one protection device is layered on a lateral surface of the casing.

3. The electrochemical device according to claim 1, wherein the protection device is one interrupting electric current when temperature of the electrochemical device increases.

4. The electrochemical device according to claim 1, wherein the protection device is selected from the group consisting of a PTC device, thermal fuse, bimetal device and Zener diode.

5. The electrochemical device according to claim 1, wherein the lead or the protection device is taped with an insulation film in order to prevent short circuit.

6. The electrochemical device according to claim 1, wherein the protection device is coated with a polymer capable of inhibiting infiltration of electrolyte.

7. The electrochemical device according to claim 1, wherein the protection device has a portion extending along a direction away from the longitudinal direction of the lead connected by the protection device.

8. The electrochemical device according to claim 7, wherein the protection device has a portion extending along a direction perpendicular to the longitudinal direction of the lead connected by the protection device.

9. The electrochemical device according to claim 1, wherein the cathode lead or anode lead is connected with the protection device by welding.

10. The electrochemical device according to claim 1, which includes a stacked electrode assembly to which a cathode lead and anode lead are connected, each lead being folded so as to provide a V-form, and the protection device is disposed in a space resulting from the V-form created by the cathode lead or anode lead.

11. The electrochemical device according to claim 2, wherein the protection device is one interrupting electric current when temperature of the electrochemical device increases.

12. The electrochemical device according to claim 2, wherein the protection device is selected from the group consisting of a PTC device, thermal fuse, bimetal device and Zener diode.

13. The electrochemical device according to claim 2, wherein the protection device is coated with a polymer capable of inhibiting infiltration of electrolyte.

14. The electrochemical device according to claim 2, wherein the protection device has a portion extending along a direction away from the longitudinal direction of the lead connected by the protection device.

15. The electrochemical device according to claim 14, wherein the protection device has a portion extending along a direction perpendicular to the longitudinal direction of the lead connected by the protection device.

16. The electrochemical device according to claim 2, wherein the cathode lead or anode lead is connected with the protection device by welding.

17. An electrochemical device pack, which includes one electrochemical device or a plurality of electrochemical devices as claimed in claim 1.

18. The electrochemical device as claimed in claim 17, wherein the electrochemical devices are connected in series or in parallel.

19. An electrochemical device pack, which includes one electrochemical device or a plurality of electrochemical devices as claimed in claim 2.

20. The electrochemical device as claimed in claim 19, wherein the electrochemical devices are connected in series or in parallel.

* * * * *